US012049098B2

(12) United States Patent
Witter

(10) Patent No.: US 12,049,098 B2
(45) Date of Patent: Jul. 30, 2024

(54) POCKET WITH STRESS RELIEF

(71) Applicant: ACCO Brands Corporation, Lake Zurich, IL (US)

(72) Inventor: Kevin Witter, Fort Collins, CO (US)

(73) Assignee: ACCO Brands Corporation, Lake Zurich, IL (US)

(*) Notice: Subject to any disclaimer, the term of this patent is extended or adjusted under 35 U.S.C. 154(b) by 0 days.

(21) Appl. No.: 18/195,637

(22) Filed: May 10, 2023

(65) Prior Publication Data

US 2023/0278359 A1 Sep. 7, 2023

Related U.S. Application Data

(63) Continuation of application No. 17/488,684, filed on Sep. 29, 2021, now Pat. No. 11,701,915, which is a continuation of application No. 16/796,597, filed on Feb. 20, 2020, now Pat. No. 11,179,960, which is a continuation of application No. 15/991,427, filed on May 29, 2018, now Pat. No. 10,618,342, which is a continuation of application No. 12/020,909, filed on Jan. 28, 2008, now Pat. No. 10,005,310.

(60) Provisional application No. 60/897,957, filed on Jan. 29, 2007.

(51) Int. Cl.
*B42F 7/02* (2006.01)
*B42F 7/06* (2006.01)

(52) U.S. Cl.
CPC . *B42F 7/02* (2013.01); *B42F 7/06* (2013.01)

(58) Field of Classification Search
CPC .................................... B42F 7/02; B42F 7/06
USPC ........... 281/2, 3.1, 5, 15.1, 29, 45; 229/67.1, 229/67.3; 402/70, 73, 79, 502
See application file for complete search history.

(56) References Cited

U.S. PATENT DOCUMENTS 6,168,340 B1 * 1/2001 Lehmann ............... B42F 11/00 281/38

* cited by examiner

*Primary Examiner* — Justin V Lewis
(74) *Attorney, Agent, or Firm* — Fitch, Even, Tabin & Flannery LLP

(57) ABSTRACT

A pocket structure including a first panel, and a second panel coupled to the first panel to define a pocket with the first panel. The second panel has an opening intersecting an outer edge thereof. The opening has a transverse portion oriented generally parallel to the outer edge and a leg portion oriented generally perpendicular to the outer edge.

17 Claims, 4 Drawing Sheets

POCKET WITH STRESS RELIEF

This application is a continuation of U.S. patent application Ser. No. 17/488,684 filed on Sep. 29, 2021, now issued as U.S. Pat. No. 11,701,915, which is a continuation of U.S. patent application Ser. No. 16/796,597 filed on Feb. 20, 2020, now issued as U.S. Pat. No. 11,179,960, which is a continuation of U.S. patent application Ser. No. 15/991,427 filed on May 29, 2018, now issued as U.S. Pat. No. 10,618,342, which is a continuation of U.S. patent application Ser. No. 12/020,909 filed on Jan. 28, 2008 and entitled POCKET WITH STRESS RELIEF, now issued as U.S. Pat. No. 10,005,310, which in turn claims priority to U.S. Provisional Application Ser. No. 60/897,957 filed on Jan. 29, 2007 and entitled POCKET WITH STRESS RELIEF. The entire contents of these applications are incorporated by reference herein.

The present disclosure is directed to a pocket design, and more particularly, to a pocket design incorporating stress relief features.

BACKGROUND

Many consumer and office products, such as binders, notebooks, portfolios, planners, date books, insert pockets and the like are made of or include a pair of flat, opposed panels joined together at their outer edges to define a pocket therebetween. Such pockets may be prone to wear and tear over the course of time. More particularly, the outer edges of the pocket may be stressed and may tear. Accordingly, there is a need for a pocket design which can accommodate such stresses and avoid tearing thereof.

SUMMARY

This disclosure in a first aspect provides a device for receiving and storing one or more objects such as papers or the like. The device comprises a major panel and a pocket panel attached to the inner surface of the major panel to define a pocket between the major panel and the pocket panel. The pocket panel includes a secured edge along which the pocket panel is attached to the major panel and a free edge along which the pocket panel is unattached to the major panel. The pocket panel is attached such that the free edge is moveable away from the major panel to allow one or more objects to be inserted into the pocket. The free edge is disposed next to the secured edge and extends transversely of the secured edge. The pocket panel comprises a stress relief area located along the free edge proximate to the secured edge.

In one embodiment of the first aspect, the stress relief area may be located at an end of the free edge proximate to the secured edge.

In another embodiment, the stress relief area may include an element selected from the group consisting of an opening, a recess and a cutout. The element may be formed in the pocket panel. In this embodiment, the element may extend from the free edge generally toward the secured edge. Alternatively, the element may be generally "z"-shaped and may comprise a pair of proximal and distal legs interconnected by a transverse portion. Each of the proximal and distal legs may extend generally perpendicular to the free edge while the transverse portion may extend generally parallel to the free edge and generally perpendicular to the legs. Alternatively, the transverse portion may define an acute angle with respect to the free edge. The pocket panel may further include a short attachment edge along which the pocket panel is secured to the major panel. Such a short attachment edge may extend from the secured edge toward the proximal leg of the element. The pocket panel may have a corner between the secured edge and the free edge while the device may include a securing member placed at the corner. The securing member may extend through the pocket panel and the major panel to securely couple them together. The element may be positioned proximate to the securing member.

The disclosure in a second aspect provides a pocket device for receiving and storing one or more paper-like objects. The pocket device comprises a first major panel and a first generally rectangular pocket panel attached to the major panel to define a first pocket between the major panel and the pocket panel. The pocket panel has a pair of first and second adjacent secured edges along which the pocket panel is attached to the major panel. The pocket panel also has at least one free edge along which the pocket panel is unattached to the major panel. The at least one free edge is disposed next to the first secured edge at a position spaced from and opposed to the second secured edge. The pocket panel comprises a first cutout disposed at a location along the at least one free edge proximate to the first secured edge.

In one embodiment of the second aspect, the cutout may extend from the at least one free edge generally toward the first secured edge.

In another embodiment, the at least one free edge may comprise a pair of first and second free edges. The first free edge may be disposed next to the first secured edge at a position spaced from and opposed to the second secured edge whereas the second free edge may be disposed at a position spaced from and opposed to the first secured edge. The second free edge may extend from the first free edge toward the second secured edge. The first cutout may be disposed at a location along the first free edge proximate to the first secured edge. In this embodiment, the first cutout may extend from the first free edge generally toward the first secured edge. The pocket panel may further comprise a second cutout disposed at a location along the second free edge proximate to the second secured edge. The second cutout may extend from the second free edge generally toward the second secured edge.

In another embodiment, the pocket panel may further include a third secured edge along which the pocket panel is attached to the major panel. The third secured edge may be disposed at a position spaced from and opposed to the first secured edge. In this embodiment, the at least one free edge may comprise a single free edge disposed between the first and third secured edges at a position spaced from and opposed to the second secured edge. The first cutout may be disposed at a location along the single free edge proximate to the first secured edge. The first cutout may extend from the single free edge generally toward the first secured edge. The pocket panel may further comprise a second cutout disposed at a location along the single free edge proximate to the third secured edge. The second cutout may extend from the single free edge generally toward the third secured edge.

In a further embodiment, the pocket device may further comprise a second major panel pivotably connected to the first major panel. In this embodiment, the pocket device may further comprise a second generally rectangular pocket panel attached to the second major panel to define a second pocket between the second major panel and the second pocket panel.

The disclosure in a third aspect provides a folder for paper-like objects which comprises a pair of first and second major panels and a pocket panel. The first and second major panels are pivotably connected together such that either the first or second major panel is moveable between an opened position and a closed position. In the opened position, the first and second major panels lay generally flat in substantially the same plane whereas in the closed position, the first and second major panels are disposed in a generally parallel relationship. The pocket panel is attached to at least one of the first and second major panels to define a pocket between the pocket panel and the at least one major panel. The pocket panel includes a secured edge along which the pocket panel is attached to the at least one major panel and a free edge along which the pocket panel is unattached to the at least one major panel. The free edge is disposed next to the secured edge and extends transversely of the secured edge. The pocket panel comprises at least one cutout disposed at a location along the free edge proximate to the secured edge.

In one embodiment of the third aspect, the folder may further comprise a spine pivotably interconnecting the first and second major panels. In this embodiment, the folder may further comprise a binding mechanism mounted to one of the spine, the first major panel and the second major panel.

In another embodiment the present disclosure is directed to a pocket structure including a first panel, and a second panel coupled to the first panel to define a pocket with the first panel. The second panel has an opening intersecting an outer edge thereof. The opening has a transverse portion oriented generally parallel to the outer edge and a leg portion oriented generally perpendicular to the outer edge.

DETAILED DESCRIPTION

Figure 1:
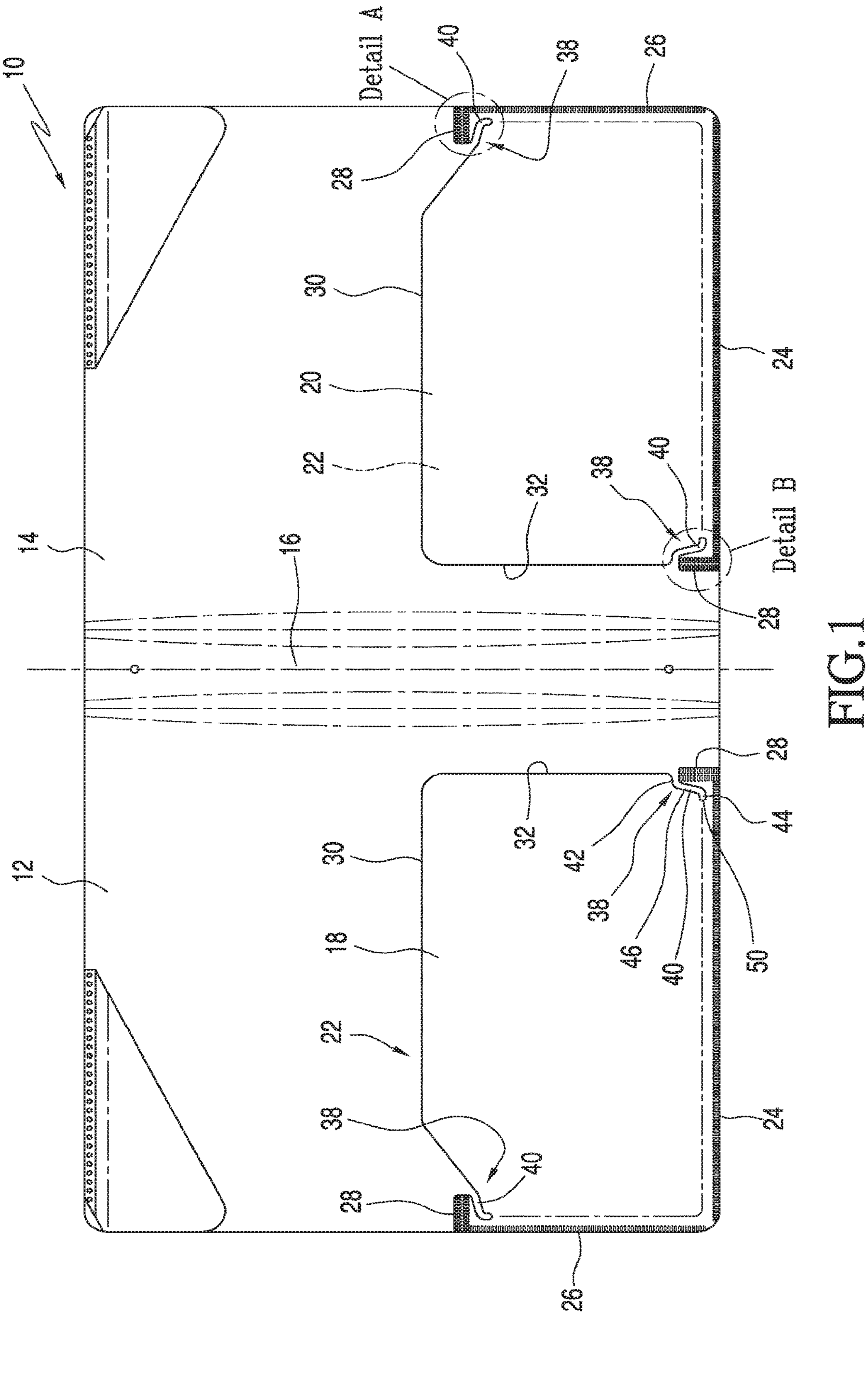
FIG. 1 is a top view of one embodiment of a binder in its open position utilizing a disclosed pocket design.

As shown in FIG. 1, in one embodiment the present disclosure is a folder or binder 10 having a pair of opposed major panels 12, 14. Each major panel 12, 14 is attached to opposed sides of a spine 16 that is positioned between the major panels 12, 14. In this manner, each major panel 12, 14 is independently pivotable about the spine 16 such that the binder 10 is moveable between an open position (shown in FIG. 1) wherein the major panels 12, 14 lay generally flat and co-planar, and a closed position (not shown) wherein the major panels 12, 14 are generally parallel, aligned, and face each other. If desired, a binding mechanism (such as a three-ring binding mechanism) or the like may be mounted to the spine 16 or to one of the major panels 12, 14.

Generally rectangular pocket panels 18, 20 are attached to the inner surface of an associated major panel 12, 14 to define a pocket 22 therebetween. More particularly, each pocket panel 18, 20 may be securely coupled to the underlying major panel 12, 14 along two major outer edges 24, 26 thereof, for example by welding. Each pocket panel 18, 20 may be further secured to the associated major panel 12, 14 by a pair of short inwardly-extending attachment lines 28, for example by welding. Each pocket panel includes a pair of free edges 30, 32 that are not directly coupled to the associated major panel 12, 14. Each pocket 22 can be sized to receive the lower portions of eight and one-half inch by eleven inch sized papers, or can be sized to receive various other-sized papers or components therein.

The major panels 12, 14, pocket panels 18, 20 and spine 16 can be made of any of a wide variety of materials, including but not limited to cardboard, paperboard, plastic (such as polypropylene or vinyl), plastic encased cardboard, etc. The pocket panels 18, 20 can be attached to the associated major panel 12, 14 by any of a wide variety of methods, such as heat welding, sonic welding, stitching, adhesives, staples, rivets or other mechanical fasteners, etc.

Figure 3:
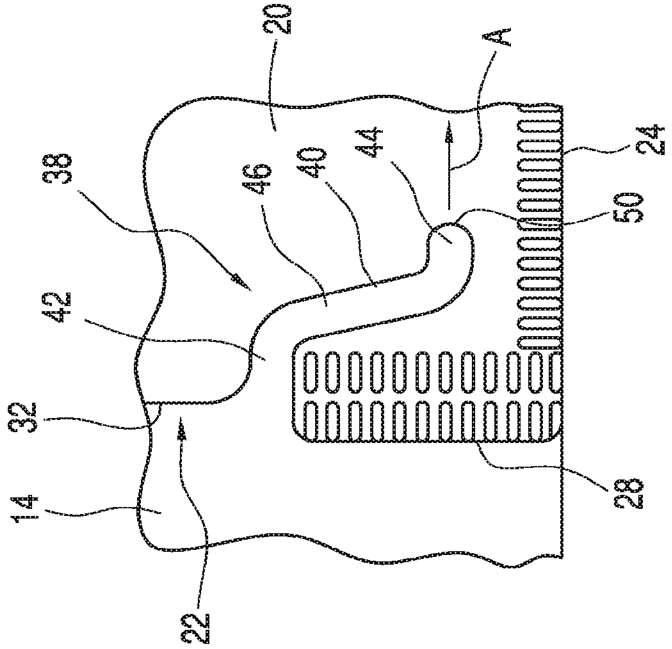
FIG. 3 is a top view of the area indicated Detail B in FIG. 1.
Figure 2:
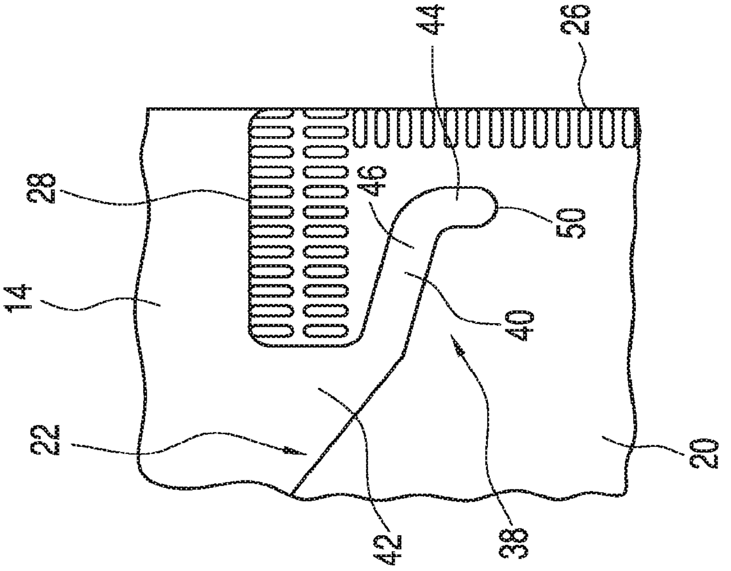
FIG. 2 is a top view of the area designated Detail A in FIG. 1.

Each free edge 30, 32 of each pocket panel 18, 20 is moveable away from the underlying major panel 12, 14 to allow any flat, paper-like objects such as papers, loose components or the like to be inserted into the pocket 22. As best shown in FIGS. 2 and 3, a stress relief feature, generally designated 38, may be located at the outer edge of each free edge 30, 32 (i.e. at or proximate to a location where a free edge 30, 32 and a secured edge 24, 26, 28 intersect). The stress relief feature 38 can be an opening, recess or cut-out (hereinafter collectively termed an opening 40) in the pocket panel 18, 20. In the illustrated embodiment, the opening 40 is generally zigzag or "z"-shaped having a pair of relatively short legs 42, 44 (a proximal leg 42 and a distal leg 44) connected by a longer transverse portion 46.

In the illustrated embodiment, each leg 42, 44 extends generally or at least partially perpendicular to the adjacent free edge 30, 32, and the transverse portion 46 extends generally or at least partially parallel to the free edge 30, 32 and generally perpendicular to the legs 42, 44. In addition, in the illustrated embodiment, the transverse portion forms an acute angle (in one case between about 0 and about 30 degrees) relative to the free edge 30, 32. The distal leg 44 terminates at a terminal point 50. Each leg 42, 44 may have length that is about equal to or less than the length of the associated transverse portion 46. The transverse portion 46 is positioned between the legs 42, 44, or between the distal leg 44 and the adjacent free edge 30, 32 of the pocket 22.

An opening 40 can be located at each position of each pocket 22 where a free edge 30, 32 and a secured edge 24, 26, 28 intersect. The openings 40 help to reduce stress and tearing of the pocket 22 when the pocket panel 18, 20 is pulled away from the underlying major panel 12, 14. More particularly, when the pocket panel is pulled away any stresses are guided to the terminal tip 50 of the opening 40. In addition, the applied stresses are applied in the direction of the arrow A of FIG. 3. It can be seen that there is a relatively large amount of material of the pocket panel 20 about the terminal point 50 to help accommodate the stresses at the terminal point 50. In addition, because the stress A is directed generally perpendicular to the associated free edge 32, and generally parallel to the adjacent secured edge 24, it can be seen that any tear in the pocket panel 20 can travel for a significant distance in the direction of arrow A before the tear would reach any outer edges 24, 26, 28, 30, 32 of the pocket panel.

Thus, it can be seen that the proximal leg 42 of the opening 40 of FIG. 3 guides any applied stresses inwardly away from the free edge 32, the transverse portion 46 guides the stresses further inwardly away from the free edge 32 and away from the proximal leg 42. Finally, the distal leg 44 guides the stresses even further away from the free edge 32 and in a direction generally perpendicular to the free edge 32.

The changes of directions, corners and terminal point 50 of the opening 40 may be curved (i.e. having a radius of at least about 0.06 inches) to avoid the presence of sharp corners which can concentrate stresses. The opening 40 may have a generally uniform width (i.e. between about 0.05 and about 0.2 inches) and may have a total length that is between about one and about ten times as long as its width. The opening 40 may extend a total distance that is less than about 1/10 of the perimeter of the pocket 22. In one embodiment the proximal leg 42 of the opening 40 can terminate in a relatively wide mouth, as shown in FIG. 2.

Thus, the stress relief feature 38 allows the pocket panels 18, 20 to be pulled away from the major panel 12, 14 while reducing and minimizing tearing, and also reducing any adverse effects should any tearing occur. This provides a more durable tear-resistant pocket 22. Furthermore, the stress relief feature 38 can allow the pocket panels 18, 20 to be made of thinner and/or cheaper materials while still resisting tearing to thereby reduce the overall cost of the pocket 22.

Figure 4:
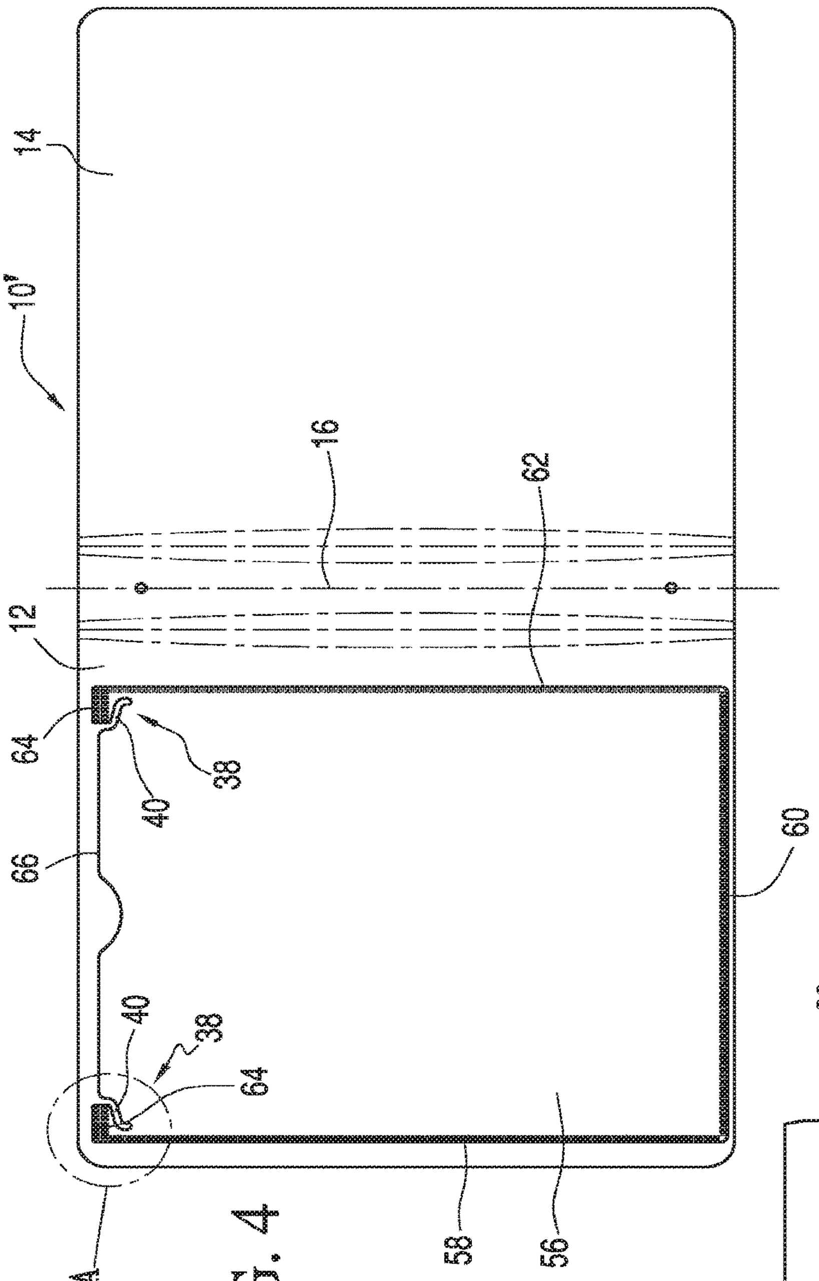
FIG. 4 is a top view of a binder in its open position utilizing another pocket design.
Figure 5:
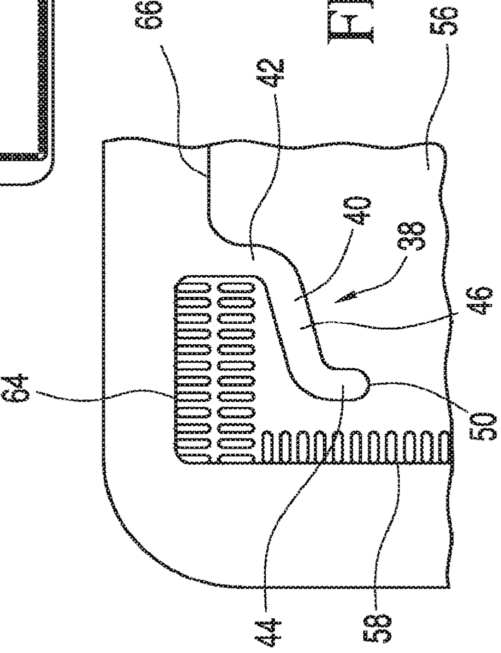
FIG. 5 is a top view of the area designated Detail A in FIG. 4.

FIGS. 4 and 5 show another binder 10 with a relatively large pocket panel 56 attached to the underlying major panel 12 about three edges 58, 60, 62, for example by welding and along two short attachment lines 64, for example by welding. The pocket panel 56 is unattached along its free edge 66. A pair of stress relief features 38/openings 40 having features similar to the stress relief features 38/openings 40 described above are provided at the outer tips of the free edge 66 of the pocket panel 56.

Figure 6:
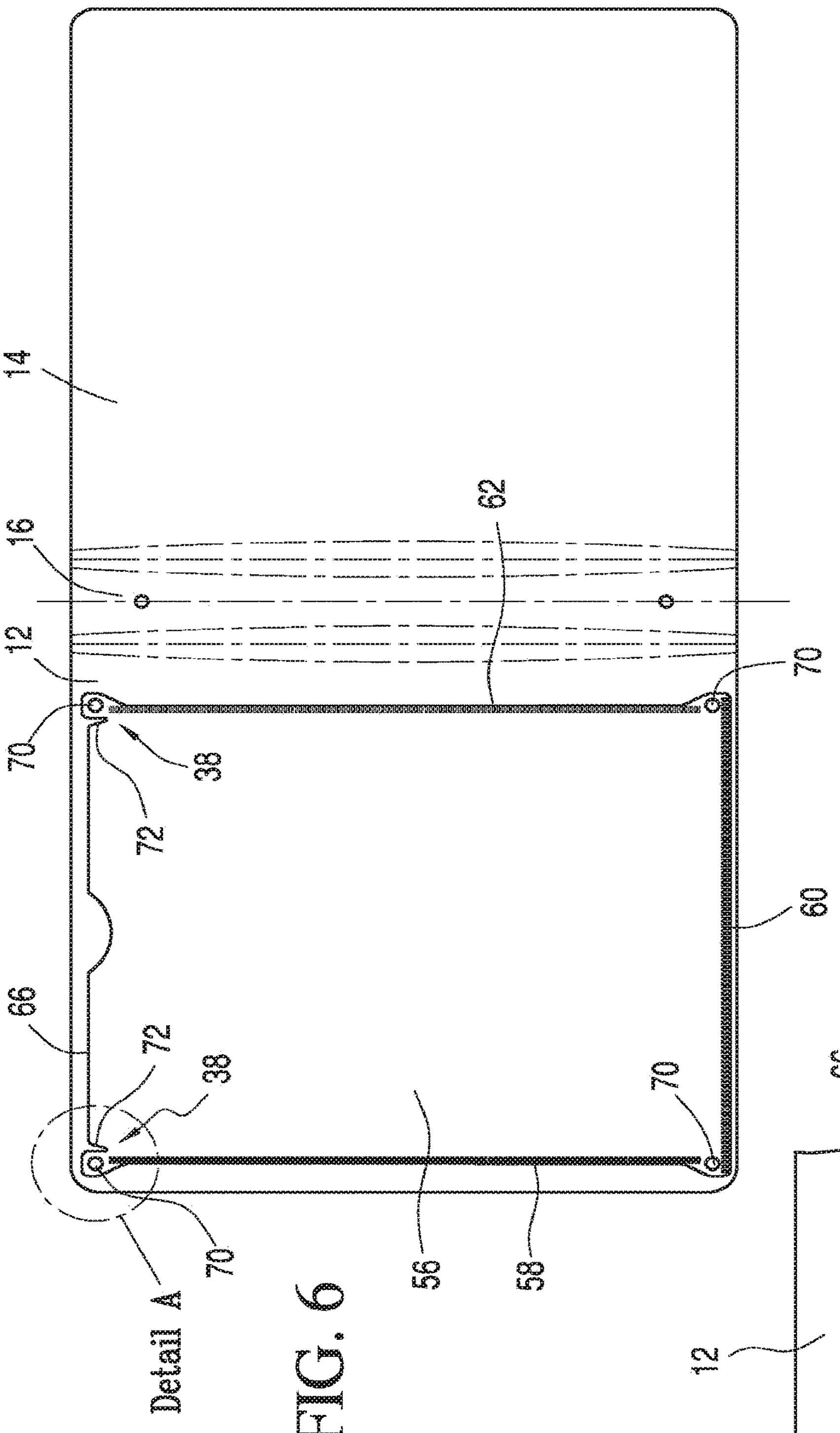
FIG. 6 is a top view of a binder in its open position utilizing another pocket design.
Figure 7:
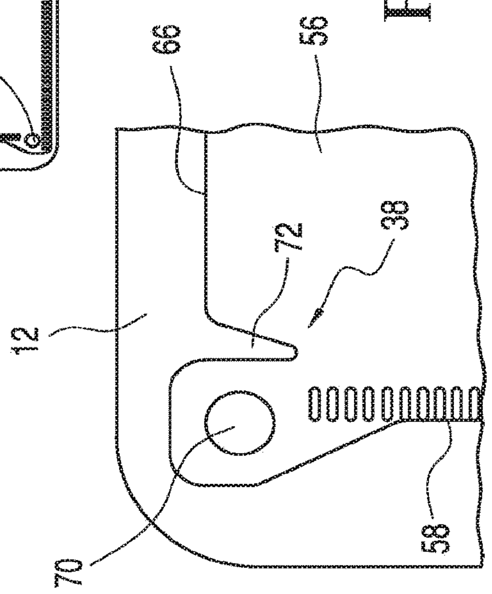
FIG. 7 is a top view of the area indicated Detail A in FIG. 6.

In the embodiment of FIGS. 6 and 7, the pocket panel 56 is coupled to the underlying major panel 12 about three secured edges 58, 60, 62, and the pocket panel 56 includes a free upper edge 66. In addition, a rivet 70 is located at each corner of the pocket panel 56, and extends through the pocket panel 56 and major panel 12 to securely couple the pocket panel 56 and major panel 12 together. The rivets 70 provide an extremely strong connection, but the location of the rivets 70 also provides a position of high stresses when the pocket panel 56 is pulled away from the major panel 12. A stress relief feature 38, in the form of an opening, recess or cut-out (hereinafter collectively termed an opening 72), can be positioned between each rivet 70 and the adjacent free edge 66. In the embodiment illustrated in FIGS. 6 and 7, the opening 72 is a generally "v" or "u"-shaped notch.

When the pocket panel 56 is pulled away from the major panel 12, the openings 72 allow the free edge 66 to be pulled further away from the underlying panel 12 before large stresses, which can cause tearing in the pocket panel 56, are induced in the pocket panel 56. Thus the openings 72 provide a greater range of motion and direct stresses away from the rivets 70. The tip of each opening 72 may be curved, and may have a radius of at least, for example, about 0.05 inches, or at least about 0.1 inches, or at least about 0.5 inches, to help avoid or minimize tearing.

The pocket design of the present invention can be used in nearly any pocket used alone or in pockets used in conjunction with or integrated into other school or office items, such as binders, notebooks, portfolios, planners, date books, insert pockets and the like. Further it should be noted that the various materials and dimensions shown in the attached drawing are illustrative of only a few embodiments of the invention, and the invention is not limited to such materials and dimensions.

Having described the invention in detail and by reference to the various embodiments, it should be understood that modifications and variations thereof are possible without departing from the scope of the invention.

In one embodiment, the present invention is a pocket structure including first and second generally flat, planar panels. The first panel is coupled to the second panel at least partially along at least one secured edge, and is not coupled to the second panel at least partially along at least one free edge, to define a pocket therebetween. The first panel has an opening positioned at or proximate to an intersection of the secured edge and the free edge. The opening includes a transverse portion extending generally parallel to the free edge, and a leg portion extending generally perpendicular to the free edge, wherein the transverse portion is positioned between the leg and the free edge.

What is claimed is:

1. A pocket structure including:

a first panel; and a second panel coupled to the first panel to define a pocket with the first panel, wherein the second panel has an opening intersecting an outer edge of the second panel, the opening having a transverse portion oriented generally parallel to the outer edge and a leg portion oriented generally perpendicular to the outer edge, wherein the transverse portion is positioned between the leg portion and the outer edge.

2. The pocket structure of claim 1 wherein the leg portion is positioned between the transverse portion and the outer edge.

3. The pocket structure of claim 1 wherein the opening has a supplemental leg portion oriented generally perpendicular to the outer edge, and wherein the transverse portion is positioned between the leg portion and the supplemental leg portion.

4. The pocket structure of claim 3 wherein the opening is generally "z" shaped.

5. The pocket structure of claim 3 wherein the transverse portion has a length greater than a length of the leg portion and a length of the supplemental leg portion.

6. The pocket structure of claim 1 wherein the transverse portion is oriented at an angle relative to the outer edge of equal to or less than 30 degrees.

7. The pocket structure of claim 1 wherein the first panel and second panel are both rectangular in top view, and wherein the first panel is larger in top view than the second panel, and wherein two outermost edges of the second panel are each aligned with an associated outermost edge of the first panel.

8. The pocket structure of claim 1 wherein the second panel is not coupled to the first panel along the outer edge such that the outer edge is movable away from the first panel to allow items to be inserted into the pocket.

9. The pocket structure of claim 1 wherein the second panel is coupled to the first panel at least partially along a secured edge and wherein the second panel is not coupled to the first panel at least partially along a free edge which includes the outer edge, and wherein the opening is positioned at or adjacent to an intersection of the secured edge and the free edge.

10. The pocket structure of claim 9 wherein the free edge is oriented perpendicular to the secured edge.

11. The pocket structure of claim 9 wherein the second panel is directly secured to the first panel along an entire length of the secured edge.

12. The pocket structure of claim 9 wherein the free edge includes a secured portion along which the second panel is directly secured to the first panel, and wherein the secured portion of the free edge extends entirely from the opening to the secured edge.

13. The pocket structure of claim 9 wherein the free edge includes a secured portion along which the second panel is directly secured to the first panel, and wherein the secured portion is oriented generally parallel to the transverse portion.

14. The pocket structure of claim 9 wherein the second panel has a supplemental free edge oriented perpendicular to the free edge and a supplemental secured edge oriented perpendicular to the secured edge, and wherein the second panel has a supplemental opening positioned along the supplemental free edge and intersecting the supplemental secured edge.

15. A pocket structure including:

a first panel; and a second panel coupled to the first panel to define a pocket with the first panel, wherein the second panel has an opening intersecting an outer edge of the second panel, the opening having a transverse portion and a leg portion oriented generally perpendicular to the transverse portion, wherein the transverse portion is oriented generally parallel to the outer edge and forms and angle with the outer edge of equal to or less than 30 degrees, and wherein the transverse portion is positioned between the leg portion and the outer edge.

16. A pocket structure including:

a first panel; and a second panel coupled to the first panel to define a pocket with the first panel, wherein the second panel has an opening intersecting an outer edge of the second panel, the opening having a transverse portion oriented generally parallel to the outer edge and a leg portion oriented generally perpendicular to the outer edge, wherein the opening has a supplemental leg portion oriented generally perpendicular to the outer edge, and wherein the transverse portion is positioned between the leg portion and the supplemental leg portion, and wherein the transverse portion has a length greater than a length of the leg portion and greater than a length of the supplemental leg portion.

17. The pocket structure of claim 16 wherein the opening has a supplemental leg portion positioned between the transverse portion and the outer edge, wherein the supplemental leg portion is positioned at an angle relative to the transverse portion.

* * * * *